Figure 6:
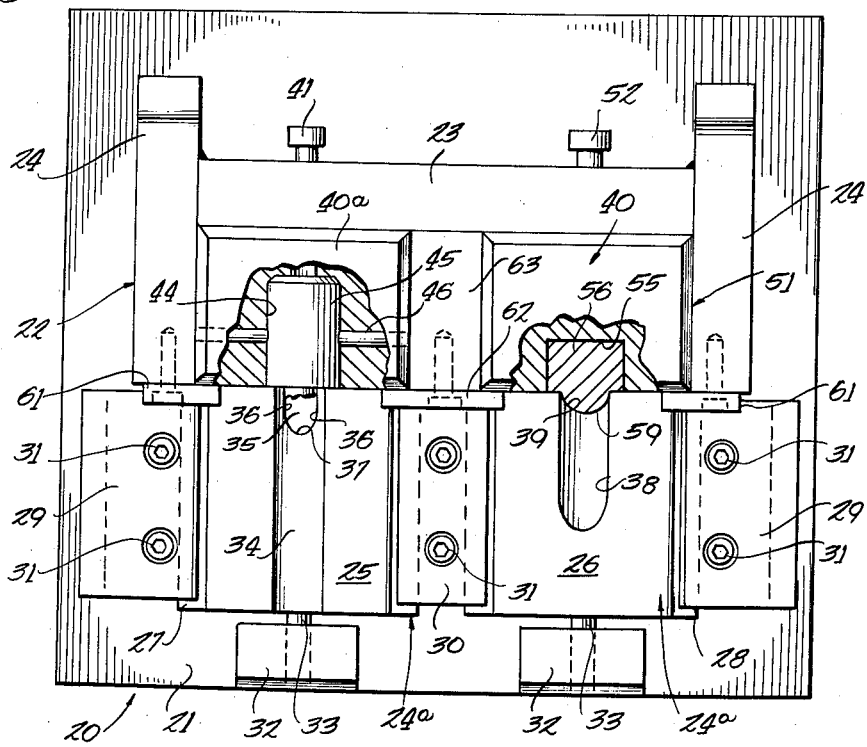

Jan. 15, 1963 F. KOSTER 3,073,195
APPARATUS FOR NOTCHING THE ENDS OF TUBING IN THE
PREPARATIONS OF TUBULAR ASSEMBLIES
Original Filed Nov. 25, 1957 2 Sheets-Sheet 1
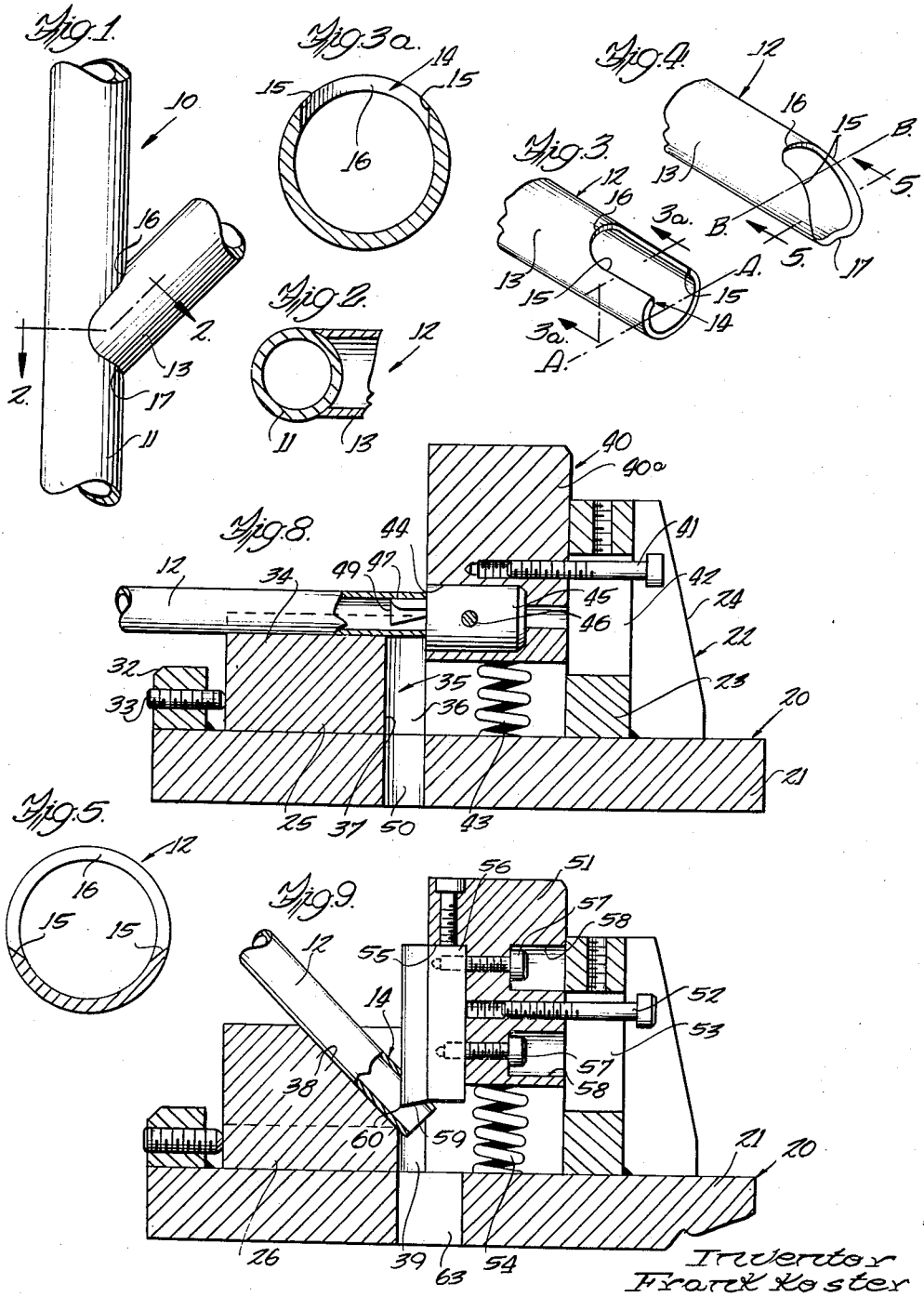

Inventor
Frank Koster

United States Patent Office 3,073,195
Patented Jan. 15, 1963

3,073,195
APPARATUS FOR NOTCHING THE ENDS OF TUBING IN THE PREPARATION OF TUBULAR ASSEMBLIES
Frank Koster, Stone Park, Ill., assignor to Vogel Tool & Die Corporation, a corporation of Illinois
Original application Nov. 25, 1957, Ser. No. 698,491, now Patent No. 3,005,369, dated Oct. 24, 1961. Divided and this application Oct. 12, 1961, Ser. No. 158,625
1 Claim. (Cl. 83—191)

This invention relates to a method and apparatus for preparing the ends of a tube. More specifically it relates to a method and apparatus for notching the ends of a tube so that the tube will conform to the contour of another tube to which it is connected in angular relation. This application is a division of applicant's copending application, Serial No. 698,491, filed November 25, 1957, now U.S. Patent No. 3,005,369, granted Oct. 24, 1961.

The Julius Vogel Patent 2,1726,519 discloses a method and apparatus for notching the ends of a tube or pipe in the process of making T-joints. Likewise the Frank Koster Patent 2,704,124 patented March 15, 1955 shows an apparatus particularly adapted for notching the opposed end sections of a tube to permit the tube to be readily assembled to the outer peripheral wall of a second tube. The latter apparatus is also particularly adapted for the preparation of tubing when making 90 degree or T-joints. Neither of the units above mentioned lend themselves particularly to the preparation of a tube end for a tubular assembly when the tubes are positioned with their axes in acute angle relation. Methods have previously been tried in the preparation of tube ends which purported to prepare the tube in such a manner that angular joints could be easily effected. However, none of the methods and apparatus previously employed have accomplished this result to a satisfactory degree.

In the preparation of tube ends for making acute angular assemblies, it is desirable, in the preparation, to shear the tube end completely to the outer wall so that a close or snug fit is obtained. A snug or close fit in the manufacture of tubular assemblies is particularly important, since such assemblies are secured together by means of brazing, the said operation requiring a very close or snug connection in order to secure proper bonding the the metal surfaces to another. In order to secure such close fit between the edges of the prepared tube and the peripheral wall of the connected tube, it is necessary to prepare the said edges so that they are in complete conformance with the contour of the tube, and the method by which this is done, and the apparatus used, is considered critical. Thus, it is applicant's prime object of this invention to provide an improved method and apparatus particularly suited for the preparation of tube ends wherein the tube end is connected to the peripheral wall of another tube in acute angle relation.

Still another object of the invention is to provide an improved method for preparing the ends of a tube, the said method including a shearing operation wherein the end of the tube is sheared in such a manner that a very close and snug fit is obtained when attaching the said tube end to another tube at an acute angle.

At still further object is the provision of a two stage die and punch assembly particularly suited for the notching and preparing of the end of a tube for connection of the said tube to another tube in tubular assembly.

A still further object is the provision of an approved method consisting of a novel series of steps designed to prepare a tube end having very snug connection when assembled in relation to another tube.

These and further objects will become more readily apparent from a reading of the specification when examined in connection with the accompanying sheet of drawing.

Figure 7:
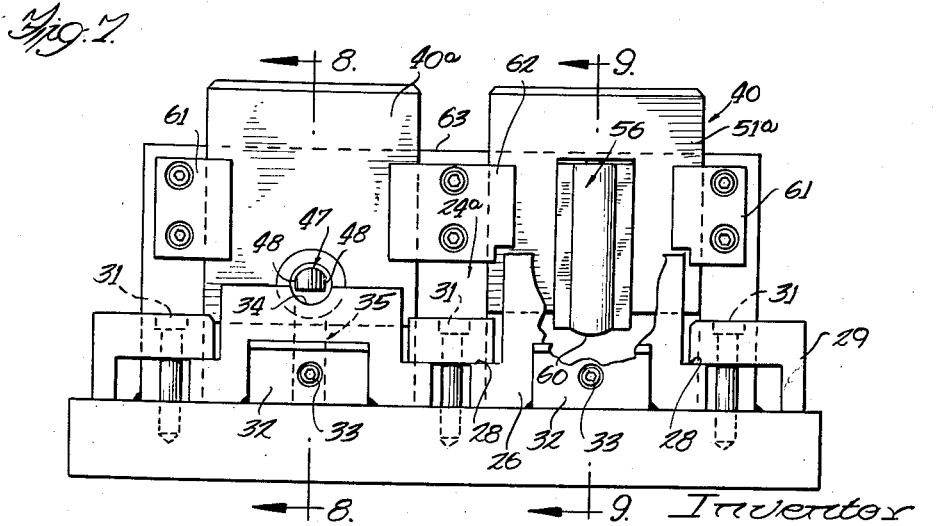

In the drawing:
FIGURE 1 is a side elevational view of a tubular assembly showing a prepared tube end in connected relation with respect to another tube;
FIGURE 2 is a cross-sectional view taken along the line 2—2 of FIGURE 1;
FIGURE 3 is a perspective view of a tube end showing a first stage in the operation of preparing the end of a tube;
FIGURE 3-A is a cross-sectional view taken substantially along the line 3-A—3-A of FIGURE 3;
FIGURE 4 is a perspective view of a tube end having a notching and shearing operation thereon performed to completion;
FIGURE 5 is a fragmentary view taken substantially along the line 5—5 of FIGURE 4;
FIGURE 6 is a plan view of an apparatus for preparing the end of a tube;
FIGURE 7 is a front elevational view of the apparatus shown in FIGURE 6;
FIGURE 8 is a cross-sectional view taken substantially along the line 8—8 of FIGURE 7; and
FIGURE 9 is a cross-sectional view taken substantially along the line 9—9 of FIGURE 7.

Referring now particularly to FIGURE 1 a tubular assembly 10 is indicated. The tubular assembly 10 is of the acute angular type in that a tube 11 is connected to a tube 12 with the axes of said tubes in angular relation. The assembly shows the tube 12 to have a tube end 13 which has its ends prepared in such a manner that it provides a close and snug fit against the outer peripheral wall of the tube 11. As indicated in FIGURE 3, the tube end 13 is first prepared with a slot generally designated at 14, the said slot having vertical sides 15 with respect to a transversely extending plane designated generally by the line A—A shown in FIGURE 3. The vertical sides 15 are joined, at the inner end of the tube end 13, by means of a wall 16, the said wall being shaped in the shape of an involute curve. In FIGURE 4, after a second operation on the tube end 13, the sides are no longer vertical but are shaped in outwardly diverging relation, as best shown in FIGURE 5. Further the tube end 13 in FIGURE 4 shows a relatively shallow slot 17 which has been provided in opposed relation with respect to the slot 14.

Referring now particularly to FIGURES 6, 7, 8 and 9, an apparatus for shaping the ends of tubing is generally designated by the reference character 20. The apparatus 20 comprises a base plate 21 on which a housing 22 is mounted. The housing 22 consists primarily of a back plate 23 suitably connected by side plates 24. A die assembly generally designated at 24a comprises a pair of laterally spaced die blocks 25 and 26. The die blocks 25 on opposite sides are provided with ears 27 and the die block 26 is provided with opposed ears 28. Outer clamps 29 and an inner clamp 30 suitably secure the die blocks 25 and 26 to the base plate 21. The clamps 29 and 30 are suitably screwed to the base by means of screws 31. Each of the die blocks 25 and 26 have at their forward ends, a stop block 32 which is rigidly secured to the base plate 21, the said blocks each including an adjusting screw 33 adapted to rigidly position the blocks 25 and 26 with respect to movement in a direction away from the housing 22. As best shown in FIGURES 6, 7 and 8, the die block 25 is provided with a horizontal recess 34 which is adapted to receive in nesting relation a tube end. The horizontal recess 34 extends the width of the block 25 and the block 25 is also provided with a vertical arcuate slot 35 which at the juncture of the recess and slots 34 and 35 respectively forms a cutting edge. The vertical slot is so shaped as to provide a pair of substantially parallel side walls 36 which are connected by an arcuate wall 37 of involute contour.

The die block 26 is provided with a recess 38, the said recess extending in an acute angle with respect to a horizonal plane through the die block 26. A slot 39 is provided in the die block 26, the said slot 39 having its upper end meeting with the recess 38 to also form a cutting edge. A punch holder assembly is generally designated at 40. The punch holder assembly includes a punch holder 40a best shown in FIGURES 6, 7 and 8. The punch holder 40a has connected thereto a screw 41 which extends through a recess 42 in the back member 23, the said screw 41 acting as a stop to limit the upward movement of the punch holder 40a. A spring 43 normally urges the punch holder 40a upwardly. The punch holder 40a is provided with a bore 44 which is adapted to contain in mating relation a shank 45 connected by means of a dowel rod 46 to the punch holder 40a. The shank 45 is provided with an integral punch 47 having parallel sides 48 and an arcuate front portion 49, the said sides 48 and and punch 49 conforming in shape to the sides 36 and wall 37 of the die block 25. A slug clearance hole 15 is provided in the base plate 21 immediately below the arcuate slot 35.

The punch holder assembly 40 also includes a punch holder 51 having a screw 52 connected thereto, the said screw 52 acting as a stop against upward movement, the said screw also projecting through a slot 53 formed in the back-up member 23. A spring 54 normally urges the punch holder 51 in an upward direction. The punch holder 51 is provided with a recess 55 containing a punch 56. The punch 56 is suitably held in position by means of screws 57 positioned in bores 58 provided in the punch holder 51. The punch 56 is provided with an outer arcuate surface 59 which conforms generally to the outer peripheral contour of the tube 11. The punch 56 is provided at its lower end with a cutting portion 60 which is adapted to suitably associate with the cutting edge of the die block 26. The punch holders 40a and 51 are suitably maintained in position on the housing 22 by means of outer securing plates 61 and inner securing plates 62, the inner securing plates 62 being suitably connected to a separator wall 63 securely connected to the back-up member 23.

The die blocks and the punch holder have been disclosed as individual or separate units but it must be understood that the die blocks may be made in one piece and the punch holders also may be made in one piece. In the manner shown, however, it is more simple to sharpen the dies and punches when desired. The apparatus 20 may be placed on the bolster plate (not shown) of a suitable punch press and when the ram of the press descends down on top of the punch holders 40a and 51, the said punch holders move downwardly so that the punches 47 and 56 engage the die blocks 25 and 26 in shearing relation. In operation, as shown in FIGURE 8, the tube 12 is placed in position in the recess 34 with the end of the tube over the punch 47. The punch holder 48 is forced downwardly and the punch which conforms to the arcuate slot 35 moves downwardly and the material is sheared from the inside out, the slug being discharged through the slot 35 and opening 50. As shown in FIGURES 3 and 3a the slot is shaped in elongated form, the sides 15 being substantially perpendicular to a plane A through the tube end. The wall 16 is of involute shape conforming to the shape of the slot 35 and the punch 47. As shown in FIGURES 3 and 3-A the initial slot formed is substantially wide, the intention being to form as wide a slot as possible. In other words the punch 47 is designed to take out as much material as possible when cutting from the inside out, so that most of the material wall extending horizontally is removed and the tube portions remaining, on laterally spaced sides, are the vertical laterally spaced portions, the substantial portions of which are, after the first shearing force, in parallel alignment with vertical tangent planes extending to the inner diameter surfaces of the tube. Thus it is these portions which are first engaged in shearing relation by the punch cutting surface 60 which moves into engagement with the vertical portions in a vertical direction. By removing most of the horizontal portions of the tube by the first shearing force and during the shearing of the wide slot, tearing and deformation is eliminated by the action of the second punch during the second shearing operation. Thus the sides 15 are disposed substantially close to and parallel to the laterally spaced vertical planes tangent to the laterally spaced inner diameter surfaces of the tube. This provides that the greater parts, after the first shearing operation, of the laterally spaced portions are in vertical alignment or are parallel to the tangent planes. Thus these portions by virtue of their vertical position relative to the vertical movement of the punch 59, have sufficient inherent resistance so that they will shear cleanly without tearing, distortion, or deformation. It has been found, that, as shown in FIGURE 3-A, the initial slot should be at least greater than the radius of the tube, or stated in another manner at least greater than one-half of the diameter.

The tube 12 is then placed into the recess 38 in the manner shown in FIGURE 9 and the punch holder 51 is then forced downwardly whereupon the cutting edge 60 and punch 56 is moved downwardly through the slot 14, the cutting edge 60 first engaging the sides 15 of the tube end at opposite spaced points as indicated by the line B—B in FIGURE 4. As the punch 56 travels downwardly the shearing edge of the slot 39 and the cutting portion 60 are effective to progressively shear the sides 15 in an inward direction. The sheared material actually is forced inwardly, and the slot 15 now becomes larger and the sides 15 now assume the diverging relation as shown in FIGURE 5. The laterally spaced vertical portions of the tube, the major portions of which are disposed vertical and are parallel to the planes tangent to the inner diameter sides of the tube, are inherently strong to provide sufficient resistance against the shearing action so that sides 15 are cleanly sheared. Continued further movement of the punch 51 causes the formation of the slot 17, the said slot being of very shallow depth 17. The slug is discharged through the opening 63 provided in the plate 21. As shown in FIGURE 1 the small radius 17 when in the assembled position of the tubes snugly fits with respect to the contour of the tube 11. Likewise the involute shaped will 16 in the position indicated snugly fits the contour of the said tube 11. By virtue of the fact that the sides 15 in the finished condition of the tube are in the tapered or diverging relation the tube 12 snugly fits against the tube 11 and a very close tolerance is held. This permits brazing or similar operations requiring very close tolerance fits. The sides 15 as shown in FIGURE 5 indicate that the shearing action is completely to the outside of the tube and, therefore, in assembly a perfect fit will be obtained. Also as indicated in FIGURE 9 the tube 12 is placed at the same angle, with respect to the arcuate surface 49 as it would be when it is placed against the tube in assembled condition as shown in FIGURE 1. The arcuate surface 59 also is of the same contour as the tube 11. Also by positioning the tube 12 in the manner indicated, as the punch 56 performs its shearing action, it has a tendency to draw the tube downwardly to prevent the same from backing off from the die block 26.

Thus it can be seen that the objects of the invention have been fully achieved and an improved method and apparatus for preparing the ends of a tube have been described.

It must be understood that changes and modifications may be made without departing from the spirit of the invention as disclosed or the scope thereof as defined in the appended claim.

What is claimed is:

Apparatus for shearing one end of a tubular member to shape the end thereof to fit against the side wall of a similar tubular member in a snug manner throughout the entire periphery of the contacting surface of the said two members comprising;

(a) a female die having a grooved surface complementary to the tubular member to be sheared and for supporting the same, (b) said female die having a recess in the bottom of said groove of a transverse dimension of less than the inner diameter of said tube but at least greater than one half the inner diameter of said tube, (c) said recess having inner vertical walls joined by a curved wall and providing a first cutting edge (d) a male die movably positioned to engage said female die, (e) a first punch on said male die, (f) said first punch having a substantially horizontal face, two vertical faces joined by a curved face, (g) said faces providing a second cutting edge and being complemental to said first cutting edge whereby said punch may be moved vertically from the inside of said tubular member supported on said female die, through said tubular member whereby said first and second cutting edges are moved into nesting relation and a first notch is formed, said notch being defined by substantially wide apart vertical sides formed on the end of said tubular member, (h) a second die having a second grooved surface and a vertical punch engaging face, said grooved surface being complementary to the tubular member to be sheared, said second grooved surface extending at an acute angle with respect to said first grooved surface and terminating in said punch engaging face, (i) said second die member having a second recess including a third curved cutting edge having its ends terminating in said punch engaging face of said second die, (j) the widest portion of said recess being of a transverse dimension substantially equal to the outer diameter of said tubular member to be sheared, (k) a second movable punch positioned against said punch engaging face and having a vertical curved face conforming to said second recess and adapted to engage said second recess in snug sliding relation, (l) said second punch having a lower fourth cutting edge conforming to said third cutting edge, (m) said fourth cutting edge being formed by the vertical curved face of said second punch and being disposed (n) substantially horizontal whereby during movement of said second punch, said fourth cutting edge initially engages the wide apart vertical side of the notched tubular member disposed in said second grooved surface to shear the same, and whereupon said fourth cutting edge moves through said tube and into nesting relation with said third cutting edge and a second notch opposed to said first notch is provided in said tubular member.

References Cited in the file of this patent

UNITED STATES PATENTS 2,064,539    Hart _____ Dec. 15, 1936
2,765,848    Bakula _____ Oct. 9, 1956